Figure 1:
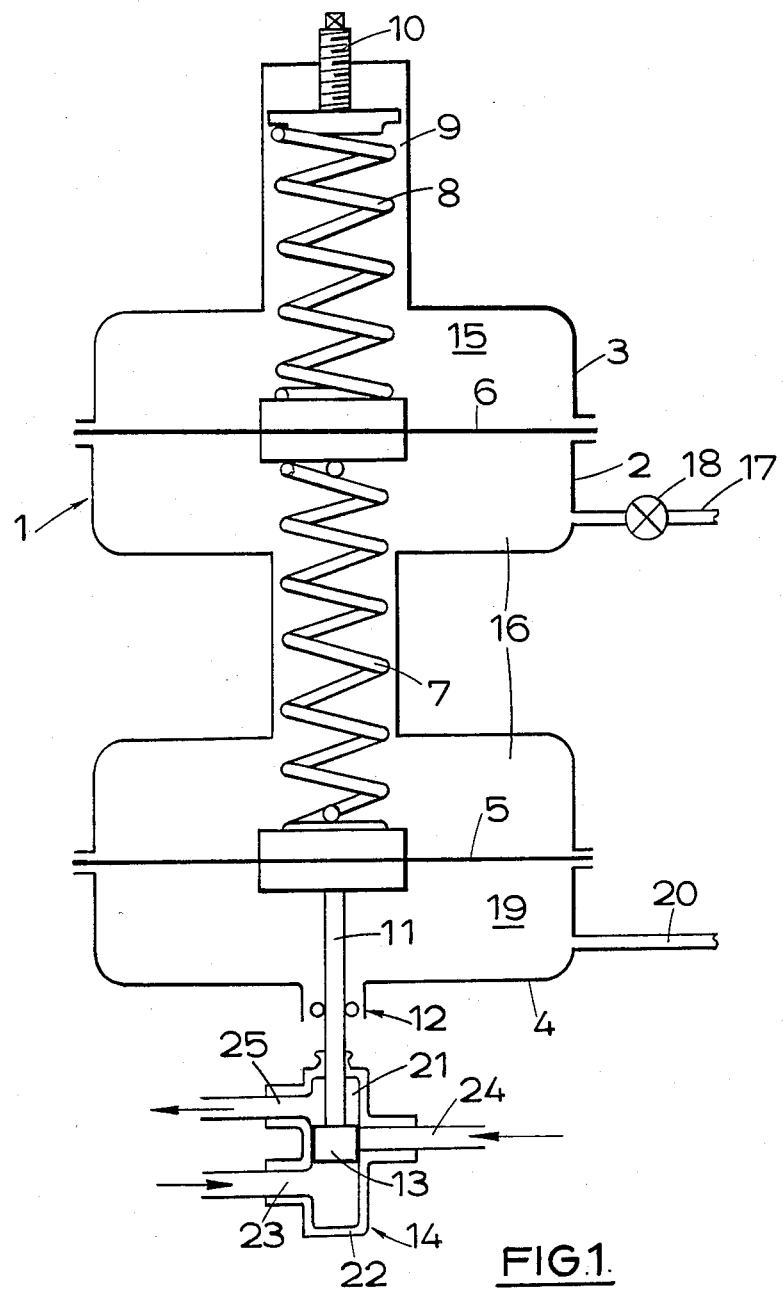

United States Patent [19]

Ashcroft

[11] Patent Number: 4,697,616

[45] Date of Patent: Oct. 6, 1987

[54] FLUID FLOW CONTROL APPARATUS

[75] Inventor: Andrew J. Ashcroft, Gloucester, England

[73] Assignee: National Research Development Corporation, England

[21] Appl. No.: 858,220

[22] Filed: Apr. 30, 1986

[30] Foreign Application Priority Data

May 2, 1985 [GB] United Kingdom ............... 8511146

[51] Int. Cl.[4] .......................................... G05D 16/00
[52] U.S. Cl. .............................. 137/486; 137/596.18; 137/625.66
[58] Field of Search .................. 137/486, 488, 596.18, 137/625.66

[56] References Cited

U.S. PATENT DOCUMENTS

| 2,230,914 | 2/1941 | Sherman | 137/486 X |
| 2,291,731 | 8/1942 | Lake | 137/486 X |
| 2,385,664 | 9/1945 | Warner | 137/486 X |
| 2,627,703 | 2/1953 | Spencer | 137/486 X |
| 3,221,764 | 12/1965 | Elbogen | 137/486 X |

Primary Examiner—Alan Cohan
Attorney, Agent, or Firm—Leydig, Voit & Mayer

[57] ABSTRACT

Apparatus for controlling the flow of water through a pipe including a valve and an orifice plate and supplying a water distribution system comprises a governor actuating a pilot valve in a servo system controlling the valve. The governor has two diaphragms linked by a tension spring the extension of which is determined by the rate of flow through the orifice plate. The first diaphragm operates a valve member of the pilot valve and is subjected to the differential pressure caused by flow through the orifice plate. The second diaphragm is loaded by a compression spring and its displacement is dependent upon the control pressure at a tapping in the pipe. The movement of the valve member is the combination of the displacements of the two diaphragms, and raises the control pressure at tapping when demand for water increases. In a modification the two diaphragms are housed in separate compartments, the first diaphragm is loaded by the tension spring against differential pressure and the displacements of the two diaphragms are combined at the pilot valve, the first diaphragm moving the valve body and the second diaphragm to the valve member. The governor may also serve as a sensitive pressure reducing valve without flow compensation, the differential pressure on the first diaphragm being derived from rate of change of pressure in the pipe and produced by throttling an impulse pipe by which a component of the differential pressure is applied to one side of the first diaphragm.

20 Claims, 3 Drawing Figures

FLUID FLOW CONTROL APPARATUS

This invention relates to fluid flow control apparatus for compressible or incompressible fluids including a fluid flow governor, particularly, though not exclusively, for use in controlling the pressure at an entry point to a distribution system or sub-system for water, for example.

When the demand for water by consumers is large the pressure drop is a water distribution system between the entry point and distant points of the system is considerable. Maintaining the entry point pressure at all times at the level necessary to provide adequate pressure at the distant points for periods of high demand can result, during periods of low demand, in excessive pressure at consumer's premises even at distant points and waste of water by unnecessary consumption and by leakage which is almost inevitable. Under low demand conditions not only does leakage form a higher proportion of the total demand but investigation has shown that some leak orifices can actually increase in area with pressure, so aggravating the problem if excessive pressures are maintained at all times.

It is one object of the present invention to provide fluid flow control apparatus which can be used in such a water distribution system to modify the governed pressure at the entry point to compensate for changes in flow.

It is another object of the invention to provide a sensitive pressure reducing valve which responds rapidly to changes in governed pressure fluctuations with less tendency to hunt than conventional sensitive pressure reducing valves.

The present invention consists in fluid flow control apparatus, for controlling the flow of fluid through a pipe, comprising a fluid flow governor; in the pipe, a fluid flow control valve controlled by the governor and producing, in operation, a control pressure at a predetermined location in the pipe downstream of the valve; and means for producing, in operation, a differential pressure derived from a characteristic of fluid flow in the pipe, the fluid flow governor having a first pressure-responsive element to which the differential pressure is applied, spring means acting on the first pressure-responsive element in opposition to the differential pressure, a second pressure-responsive element to which the control pressure is applied, means for loading the second pressure-responsive element in opposition to the control pressure and means for combining displacements of the two pressure-responsive elements to control the setting of the fluid flow control valve.

The governor may be coupled directly to the fluid flow control valve which will then be of a kind in which the extent of valve opening is varied by the governor.

Alternatively the governor may be indirectly coupled to the fluid flow control valve by servo means which may comprise, as the element to which the governor is to be directly coupled, a pilot valve in a hydraulic or pneumatic servo system, or a switch in an electrical servo system.

When the fluid flow control apparatus is intended to afford compensation for changes in flow, the characteristic of fluid flow from which the differential pressure is derived may be the rate of fluid flow through the pipe.

The fluid flow control apparatus may alternatively be intended to serve as a sensitive pressure reducing valve. The characteristic of fluid flow from which the differential pressure is derived may then be the rate of change of fluid pressure at a specified region in the pipe.

When the fluid flow control apparatus is to compensate for changes in flow, the means for producing the differential pressure comprises a device producing (in operation) a pressure which is lower than a pressure upstream of the device (the higher pressure), the difference between the higher pressure and the lower pressure being the differential pressure.

The said device may be an orifice plate in the pipe, the higher pressure being that upstream of the orifice plate and the lower pressure that in the region of the throat of the orifice plate.

The higher pressure and the lower pressure may be applied to opposed areas of the first pressure-responsive element, the resultant fluid pressure acting on the first pressure-responsive element being the differential pressure.

Where the characteristic of fluid flow from which the differential is derived is the rate of change of fluid pressure, the means for producing the differential pressure may comprise two impulse connections one to each of opposed areas of the first pressure-responsive element, from the specified region of the pipe, one of the impulse connections including restricting means for producing at the first pressure-response element on change of pressure at the region (in operation), a pressure which is lower than the pressure (the higher pressure) in the other impulse connection, the difference between the higher pressure and the lower pressure being the differential pressure.

Whatever the characteristic of fluid flow from which the differential pressure is derived, the fluid flow control apparatus may include an impulse connection including a throttling device through which fluid pressure is applied to the first pressure-responsive element. The fluid pressure affected by the throttled impulse connection may be one of the components of the differential pressure. The restriction imposed by the throttling device affects the speed of response to changes in the characteristic of fluid flow, preferably without affecting the speed of response to changes in the control pressure. The throttling device may be adjustable; a needle valve, for example.

The invention further consists in a fluid flow governor for use in fluid flow control apparatus for controlling the flow of fluid through a pipe which includes a fluid flow control valve which the governor is adapted to control and means in the pipe for producing, in operation, a differential pressure derived from a characteristic of fluid flow in the pipe, the governor comprising a first pressure-responsive element, spring means for biassing the first pressure-responsive element, a second pressure-responsive element, means for loading the second pressure-responsive element, means for enabling the differential pressure to be applied to the first pressure-responsive element in opposition to the spring means, means for enabling a control pressure to be applied to the second pressure-responsive element in opposition to the loading thereon and means for combining displacements of the two pressure-responsive elements and adapted to control the setting of the fluid flow control valve.

The displacements of the two pressure-responsive elements may be combined at actuating means coupled to the fluid flow control valve or to servo means for actuating the fluid flow control valve.

In one form of apparatus according to the invention the first pressure-responsive element is operatively coupled to the actuating means and the second pressure-responsive element is operatively coupled to the first pressure-responsive element through the spring means, the first and second pressure-responsive elements being open to a first chamber in the sense that in operation forces on the pressure-responsive elements due to pressure in the first chamber oppose the spring means, the first pressure-responsive eleement being open to a second chamber in the sense that, in operation, the first pressure-responsive element is subjected to the differential pressure resulting from the difference in pressures in the first and second chambers, and the second pressure-responsive element being loaded in the sense to oppose, in operation, pressure applied to the second pressure-responsive element in the first chamber.

In operation of such a system the higher pressure acting on the second pressure-responsive element controls directly or indirectly movement of the fluid-flow control valve to correct the governed pressure.

The first pressure-responsive element is subjected to the difference between the higher pressure and the lower pressure. The deflection of the spring means is dependent upon this pressure difference and alters the relative positions of the first and second pressure-responsive elements and therefore affects the fluid-flow control valve through the actuating means which is directly coupled to the first pressure-responsive element to modify the governed pressure in accordance with this pressure difference. The pressure difference depends on the rate of flow through the main or pipe and the governed pressure is thus flow compensated.

Alternatively the displacements of the two pressure-responsive elements may be combined at fluid flow valve means having first and second relatively movable elements which co-operate to define a closed or neutral position, the first pressure-responsive elements being operatively connected to the first relatively movable elements and the second pressure-responsive element being operatively connected to the second relatively movable elements. The relatively movable elements may be a valve body and a valve member movable therein.

The first and second pressure-responsive elements are preferably of equal effective area. A preferred form of pressure-responsive element is a flexible diaphragm but any other suitable known type of pressure-responsive element may be used such as a piston and cylinder or a bellows.

A combination of different types of pressure-responsive element could be used. For example, in the first form of apparatus according to the invention referred to above, the second pressure-responsive element may be a diaphragm and the first pressure-responsive element a bellows open at one end, the open end being connected to a movable part of the diaphragm so that the bellows is free to move relative to a housing of the governor. The diaphragm covers the open end and the first chamber is the interior space defined by the diaphragm and the internal surface of the bellows, the bellows being provided with means for applying pressure to the interior space. The second chamber surrounds the bellows. The bellows may be made of spring metal or other resilient material. The inherent resilience of the bellows may then enable the bellows to serve as, or at least complement, the spring means.

The spring means, unless constituted by the bellows, could be an air spring but is conveniently a coil spring with open coils normally loaded in tension but stiff enough and with its end coils stably supported so as to be capable, when required, of transmitting a compressive load, in the manner of a strut.

The second pressure-responsive element may be loaded by a compression spring. The stiffness of the compression spring is greater than that of the spring means, preferably within the range of two to eight times, for example four times, the stiffness of the latter. The greater the ratio of the stiffness of the compression spring to that of the spring means, the greater the effect of the difference in pressures in the first and second chambers on the displacement of the actuating means of the governor.

Figure 2:
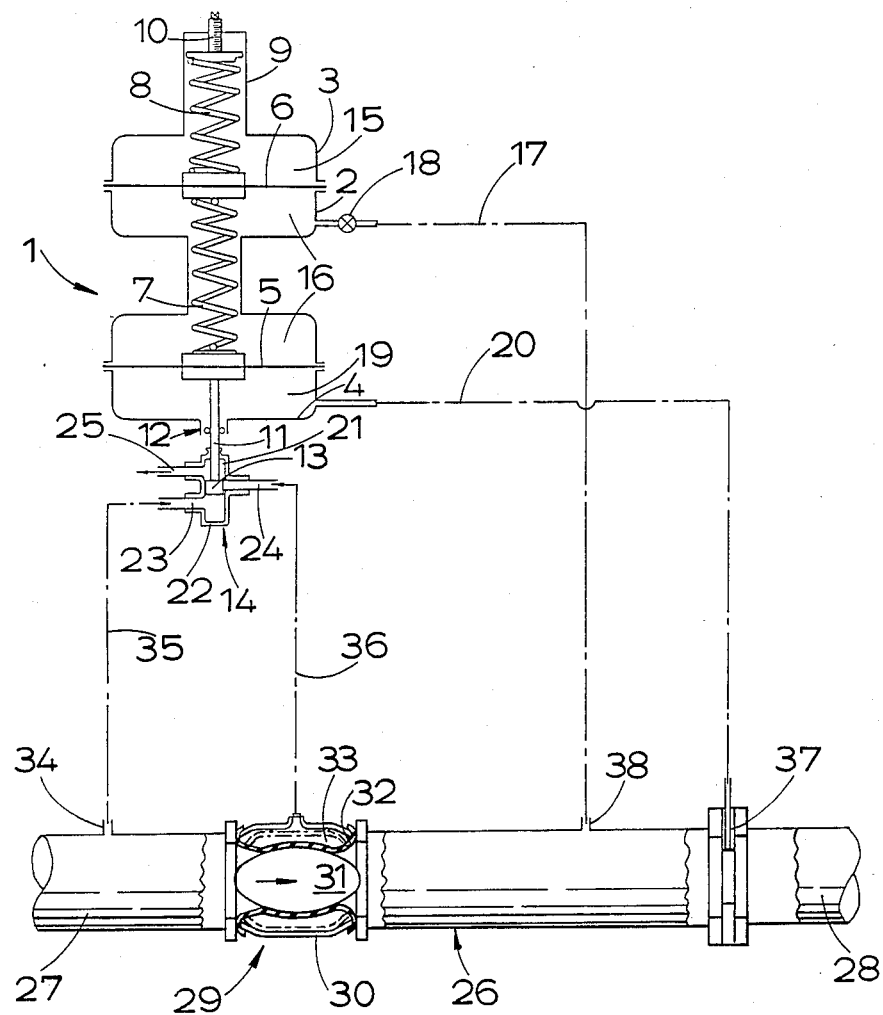
Figure 3:
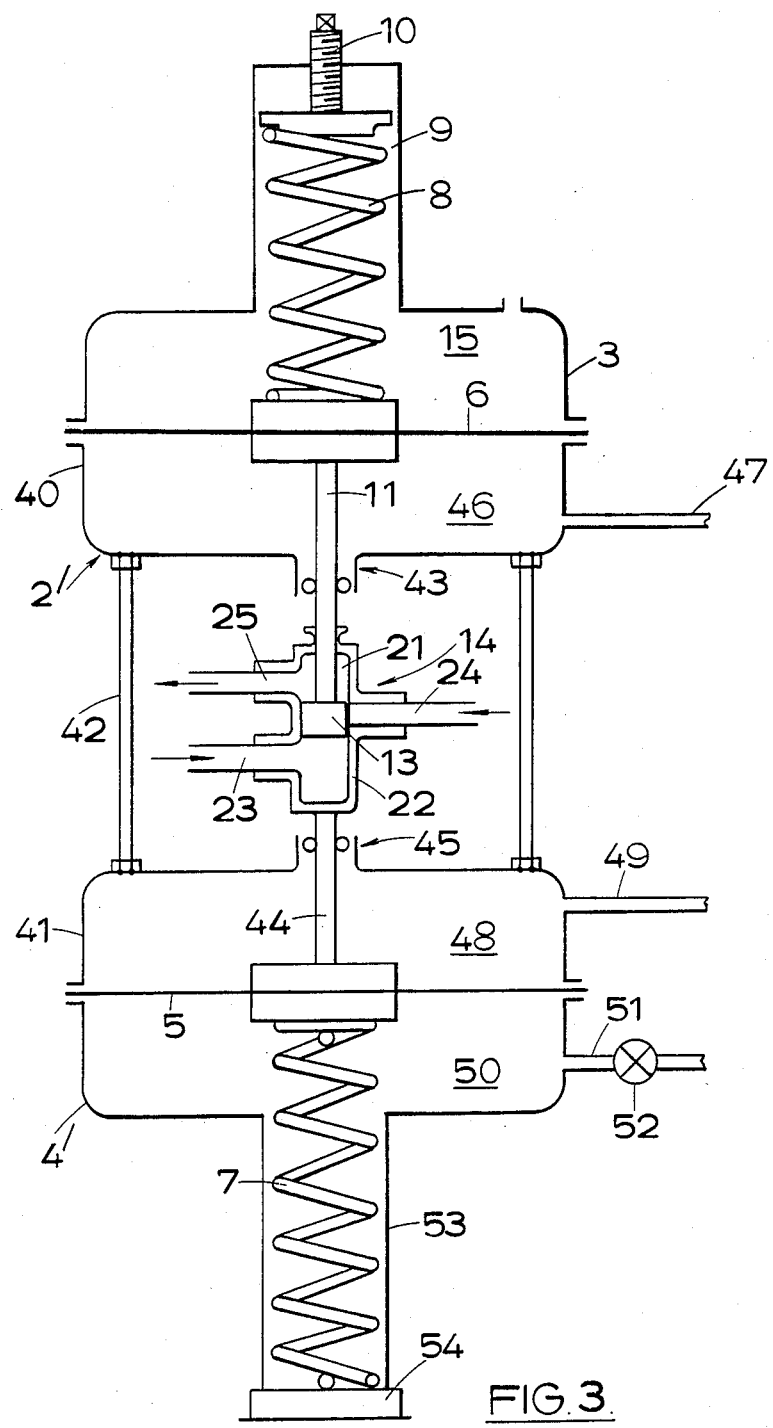

An embodiment of the invention will now be described, by way of example only, with reference to the accompanying diagrammatic drawings, in which:

FIG. 1 is a sectional view of one form of fluid-flow governor for fluid-flow control apparatus according to the invention, FIG. 2 shows fluid-flow control apparatus for a water main or pipe and including the fluid-flow governor of FIG. 1, and FIG. 3 is a sectionnal view of a modified fluid-flow governor.

The governor of FIG. 1 has a housing 1 comprising a body portion 2, a top cover 3 and a bottom cover 4. Between the body portion 2 and the bottom cover 4 a first flexible, diaphragm 5 is clamped and between the body portion 2 and the top cover 3 a second flexible diaphragm 6 is clamped. The first and second diaphragms, which are of equal effective area, are coupled by a tension spring 7. The tension spring 7 is open-coiled but is sufficiently stiff to be able, if required, to transmit a compressive load. The end coils of the spring 7 are rigidly anchored to their associated diaphragms. The second diaphragm 6 is loaded by a compression spring 8 housed in a turret portion 9 of the top cover 3. The loading of the spring 8 on the second diaphragm is variable by means of an adjusting screw 10. The first diaphragm 5 is secured to a stem 11 which passes out of the bottom cover 4 through a gland 12 and is connected, in this example, to a slidable valve member 13 of a pilot valve 14 of a servo-system for operating a fluid flow control valve to be described later. The stem 11 constitutes actuating means by which the governor exerts its control.

The diaphragms divide the interior of the housing 1 into three chambers, an intermediate chamber 16 (constituting a first chamber) between the two diaphragms which is open to a first impulse pipe 17 including a needle valve 18, a lower chamber 19, (constituting a second chamber) below the first diaphragm 5 and open to a second impulse pipe 20 and an upper chamber 15 above the second diaphragm 6 which is vented to atmosphere.

The valve member 13 is slidable in a valve chamber 21 in a body 22 of the pilot valve 14. From the chamber 21 open three ports 23, 24, 25 which in the intermediate position of the valve member 13 shown in FIG. 1 are isolated one from another. Upward movement of the stem 11 from the intermediate position shown connects ports 23 and 24, downward movement connects ports 24 and 25.

In FIG. 2 the reference 26 indicates the water main which is connected at one end 27, the upstream end, to a supply of water under pressure. The downstream end 28 of the main 26 leads to the distribution pipes of the district being served. The pipe includes a flow control valve 29, in this instance a fluid-pressure controlled valve manufactured by M.I.L. Limited and known as the INBAL valve which comprises a valve housing 30, an ovoid core 31 and a resilient sleeve 32 surrounding the core 31 and sealed at both ends to the valve housing 30, forming an annular control chamber 33 between the sleeve 32 and the wall of the housing 30.

In the absence of pressure at the upstream end 27 of the main 26 the sleeve 32 is urged by its own resilience onto the core 31 and the valve 29 is closed as shown by the full lines in FIG. 2.

If the control chamber 33 is open to atmosphere, pressure at the upstream end 27 of the main will cause the sleeve 32 to move away from the core 31 against the wall of the valve housing 30 as shown in broken lines in FIG. 2.

To regulate water flow through the valve 30 line water pressure from a tapping 34 in the upstream end 27 of the main 26, that is to say upstream of the flow control valve 29, can be applied to the control chamber 33 under the control of the pilot valve 14. The tapping 34 is connected by a pipe 35 to the port 23 of the pilot valve 14. Port 24 is connected by a pipe 36 to the control chamber 33. Port 25 is open to waste at atmospheric pressure. It will be understood that when the stem 11 and the valve member 13 are moved upwards line pressure is applied through pipes 35, ports 23 and 24 and pipe 36 to the control chamber tending to close the flow control valve 29. Return of the valve member 13 to the mid-position traps water in the control space 33 and the flow control valve 29 is retained at the particular setting reached. Downward movement of the valve member 13 from the mid-position opens the control chamber 33 through pipe 36 and ports 24 and 25 to atmospheric pressure, allowing pressure of water flowing through the flow control valve 29 to expand the sleeve 32. Water displaced from the control chamber 33 drains to waste through port 25.

Downstream of the flow control valve 29 the main 26 is provided with an orifice plate 37 the throat of which is connected to the second impulse pipe 20. A tapping 38 between the flow control valve 29 and the orifice plate 37 is connected to the first impulse pipe 17.

In service, water pressure upstream of the orifice plate (higher pressure) is supplied through the first impulse pipe 17 to the intermediate chamber 16 and applied to the upper side of the first diaphragm 5 and the underside of the second diaphragm 6. Pressure at the orifice plate throat tapping (lower pressure) is supplied through the second impulse pipe 20 to the lower chamber and applied to the underside of the first diaphragm 5 which is thus subject to the difference in pressures at the orifice throat and upstream of the orifice. At very low flows in the main 26 this differential pressure is insignificant and has no effect on the first diaphragm 5. The pressure upstream of the orifice plate on the second diaphragm 6 exerts an upward force on the second diaphragm which moves upwards until this upward force and downward force due to compression of the spring 8 are equal. As in the absence of differential pressure across the orifice there is no restraint on movement of the first diaphragm 5, the tension spring 7 remains at its natural length, moves bodily upwards with the second diaphragm 6 and causes the first diaphragm 5 to follow the movement of the second diaphragm.

The resulting upward movement of the stem 11 and valve member 13 connects ports 23 and 24 applying main pressure from upstream of the control valve 29 to the control chamber 33 and begins to close the control valve 29 to reduce the control pressure in the main 26 upstream of the orifice plate 37 until the reduction in pressure on the underside of the second diaphragm 6 and its resulting downward movement is sufficient to return the valve member 13 to the mid-position. This stops the flow of water into or out of the control chamber 33, the control valve 29 is held at the opening it has reached and the system is in equilibrium. If the control pressure should fall below the predetermined pressure, the first diaphragm moves downwards so that the valve member 13 connects ports 24 and 25 allowing water to escape to waste from the control chamber 33 increasing the opening of the flow control valve 29 to restore the governed pressure.

Under these conditions of very low flow in the main 26, therefore, the governor acts simply as a normal pressure governor monitoring and maintaining the required control pressure at the location of the tapping 38 upstream of the orifice plate 37.

At higher flows through the orifice plate 37 the pressure at the orifice throat applied to the underside of the first diaphragm 5 will fall below the control pressure upstream of the orifice plate, applied to the upper side of the first diaphragm 5. The first diaghragm 5 moves to extend the tension spring 7 until the spring force equals the force due to differential pressure of the first diaphragm 5. It will be understood from this that the extension of the tension spring 7 is proportional to the differential pressure due to flow through the orifice plate 37.

This extension of the tension spring 7 alters the distance of the valve member 13 from the second diaphragm 6. The valve member 13 will then return to its mid-position only when the second diaphragm is higher than under low flow conditions, that is, when the control pressure has risen sufficiently to cause the second diaphragm to increase the compression of the spring 8. As demand for water rises and the resulting flow through the orifice plate increases the differential pressure applied to the first diaphragm 5, the control pressure at the location in the pipe at which the tapping 38 is made will be increased in proportion to the differential pressure. The differential pressure at an orifice plate varies as the square of the flow through it. Similarly, the friction losses in a pipework system vary approximately as the square of the flow.

The entry to the water distribution system may be regarded as a point sufficiently far downstream of the orifice plate 37 for velocity head at the throat of the orifice plate to have been recovered. The governed pressure, that is to say, the pressure required at such an entry point is in this instance directly dependent upon the control pressure at the location of the tapping 38. Varying the governed pressure at the entry to the distribution system in proportion to the differential pressure at an orifice plate will enable a satisfactory delivery pressure to be maintained at the far end of the distribution system with varying flows. The facility this provides of enabling the governed pressure to be reduced substantially when the demand for water is low, for example at night, is particularly useful in avoiding waste of water at leaks in the distribution system.

The needle valve 18 is provided to enable the response of the governor to changes in flow to be delayed. Its effect may be understood by considering the following situation.

If at some stage when the system is in equilibrium the needle valve 18 is completely closed, water is trapped in the intermediate chamber 16. Relative movement between the diaphragms 5 and 6 is prevented but the two diaphragms will move in unison in response to changes in pressure in the lower chamber 19 and uner the control of the compression spring. The system is thus equivalent in this situation to a normal pressure reducing valve controlling the pressure at the throat of the orifice plate 37. Any increase in pressure at the throat will lift the diaphragms 5 and 6 raising the valve member 13 of the valve 14 to admit pressure from port 23 to port 24 and increase the pressure in the control space 33 tending to reduce the opening of the flow control valve 29 and lower the downstream pressure. A reduction in pressure at the throat will move the valve member 13 in the opposite direction to enlarge the opening of the flow control valve 29 and increase the pressure at the throat. Provided the impulse pipe 20 is unrestricted the response to changes in pressure at the throat will be rapid.

The effect of opening the needle valve very slightly will be to allow water to flow into or out of the intermedaite chamber 16 very slowly in response to changes in the differential pressure in the impulse pipes 17 and 20 that is to say the difference between the higher pressure upstream of the orifice plate 37 and the lower pressure at the throat which is dependent on the rate of flow through the main 26. There will be a gradual adjustment of the equilibrium position, the rate of adjustment in response to the differential pressure across the orifice plate 37 being controlled by the amount of throttling at the needle valve 18. For any setting of the needle valve 18 the response to pressure will continue to be rapid.

Instead of a single, simple tension spring 7 a compound spring may be provided so that the amount of compensation for change of flow will be something other than a direct proportion of orifice plate differential.

By limiting the expansion of spring 7, for example by an internal tie, the range of compensation can be limited to a fixed value. The system would continue to operate as a pressure reducing valve responsive to changes in pressure upstream of the orifice plate 37, but further increases in orifice plate differential would not raise the control pressure which the system was aiming to achieve.

A fluid flow governor according to the invention may serve as a very sensitive pressure reducing valve without flow compensation. For such a use the pressures applied to the first or intermediate chamber 16 and the second or lower chamber 19 are taken from the same point but through separate impulse pipes 17 and 20 as previously described the impulse pipe 17 including the needle valve 18 adjusted to be very nearly closed.

When conditions are constant the pressure in the chambers 16 and 19 will be the same. With no differential pressure on the diaphragm 5, the spring 7 will be at its natural length and the control pressure is under the control of the diaphragm 6 and spring 8. If the control pressure changes there will be an immediate and corresponding change of pressure in the chamber 19 but only a slow change of pressure in the chamber 16. This produces a differential pressure on the diaphragm 5 which responds rapidly under the control of the relatively low stiffness spring 7 alone to move the pilot valve member 13 markedly in the direction to correct the control pressure. The pressures in the chambers 16 and 19 will gradually equalise so that the diaphragm 6 moves towards the new position corresponding to the altered pressure in the chamber 16. The differential pressure on the diaphragm 5 becomes less so that the control pressure is again mainly under the control of the diaphragm 6. The governor can thus provide a pressure reducing valve capable of responding rapidly to control pressure fluctuations with less tendency to hunt than conventional sensitive pressure reducing valves.

In FIG. 3 parts corresponding to those in FIG. 1 bear the same reference numerals and, if not specifically mentioned in the following description, are similar in construction. The main differences in the fluid-flow governor of FIG. 3 from that of FIG. 1 are that the pilot valve 14 replaces the spring means 7 as the link between the diaphragms 5 and 6; the diaphragms have separate compartments in the housing 1; and the spring means 7 is anchored to the housing 1 instead of to the second diaphragm 6.

A body portion 2' of the housing comprises an upturned cup portion 40 and an inverted cup portion 41 rigidly secured together, for example, by stays 42. The top cover 3 is similar to the top cover in FIG. 1. A bottom cover 4' is similar to the top cover 3. The first diaphragm 5 is clamped between the cup portion 41 and the bottom cover 4' and the second diaphragm 6 is clamped between the cup portion 40 and the top cover 3. The step 11 connected to the valve member 13 of the pilot valve 14 is in the embodiment, connected directly to the second diaphragm 6 and passes out of the housing through a gland 43 in the cup portion 40.

A rod 44 connected to the first diaphragm 5 extends upwards through a gland 45 in the cup portion 41 and is secured to the body 22 of the valve 14 which, in this embodiment is free to move relative to the housing 1, pipe connections to its ports 23, 24 and 25 being made by flexible hoses (not shown).

The spring means 7, which is similar to the spring means 7 of FIG. 1 except that it need not be capable of transmitting a compressive load, is housed in a turret portion 53 of the bottom cover 4 and is anchored to a cap 54 at the lower end of the turret portion 4'. The cap 54 is preferably adjustably mounted on the turret portion 53 to enable the tension of the spring means 7 to be varied.

The upper chamber 15 above the second diaphragm 6 is vented to atmosphere as in the embodiment of FIG. 1. A chamber 46 formed by the interior of the cup portion 40 and the second diaphragm 6 is connected by an impulse pipe 47 to a location in a main or pipe at which a control pressure is to be monitored. A chamber 48 formed by the interior of the cup portion 41 and the first diaphragm 5 is open to an impulse pipe 49. A chamber 50 formed by the bottom cover 4 and the first diaphragm 5 is open to an impulse pipe 51 which includes a needle valve 52 for imposing an adjustable restriction in the impulse pipe 51.

The inpulse pipes 49 and 51 are connected to the means for producing the differential pressure, impulse pipe 49 to the lower pressure component and impulse pipe 51 to the higher pressure. The needle valve 52 enables the rate to be varied at which the governor responds to changes in differential pressure.

The impulse pipes 47, 49 and 51 may be connected independently of one another and as described above. The means for producing the differential pressure need not be at the location at which pressure is being monitored by the impulse pipe 47. For example, in a flow control system compensating for rate of flow as shown in FIG. 2, the orifice plate 37 could be in a region of the pipe upstream of the flow control valve 29. It will generally be convenient to use as one of the component pressures of the differential pressure the control pressure at the location at which pressure is being monitored and then the impulse pipe 47 can be combined with one of the other impulse pipes 49, 51. For example, in apparatus equivalent to that shown in FIG. 2 but using the governor of FIG. 3, impulse pipe 47 would be combined with the impulse pipe 51 and connected to the tapping 38 in FIG. 2, the impulse pipe 49 being connected to the throat of the orifice plate 37.

The operation of the governor of FIG. 3 in the context of apparatus of FIG. 2 may, perhaps, be more easily explained by comparison with the operation of the apparatus using the governor of FIG. 1.

Where the governor of FIG. 1 is used in the apparatus of FIG. 2, at very low flows there is no pressure difference across the diaphragm 5 and this floats unrestrained. The spring means 7 remains at its natural length and simply acts as a link between the diaphragm 6 and the valve rod 11. The diaphragm 6 can be regarded, at low flows, as a simple pressure reducing valve, moving the valve 14 about its neutral position to keep the control pressure on the underside of the diaphragm 6 constant. While the valve 14 is in its neutral position, the setting reached by the flow control valve 29 does not change. At higher flows the pressure drop across the orifice acts on the diaphragm 5 to extend the spring 7. The valve 14 will then only reach its neutral position when the diaphragm 6 has been raised by an increase in the control pressure to compress the spring 8 more. In this way the governor acts to raise the control pressure and the governed pressure at high flows.

In the modification of FIG. 3 the two diaphragms 5 and 6 are arranged in separate compartments. The spring 8 directly loads the diaphragm 6 against the control pressure as before. The pressure drop across the orifice still produces a pressure difference across the diaphragm 5 to load the spring means 7. But the spring means 7 instead of linking the diaphragms directly is anchored to the housing, and the displacements of the diaphragms are combined at the valve means, the diaphragm 6 being connected to the valve member 13 and the diaphragm 5 to the body of the valve 14.

Control pressure is still directly applied to the diaphragm 6 to compress its loading spring 8 but the diaphragm now moves the valve member 13 directly. The neutral position of the valve 14 is altered by moving the body 22 of the valve 14 relative to the valve member 13. The movement of the valve body by the diaphragm 5 depends on rate of flow and the spring rate of the spring means 7.

In this example the control pressure being monitored and kept constant under given flow conditions is the governed pressure, that is to say the pressure required, for example, at the entry to the distribution system downstream of the orifice plate to meet distribution needs. In some circumstances it may be preferred to use the lower pressure component of the differential pressure as the control pressure. This may be done by combining the impulse pipe 47 with the impulse pipe 49. If, for example, this combined connection is made to the throat of the orifice plate 37 in FIG. 2, the governed pressure is not directly proportional to the control pressure but, through equal to it at very low flows, becomes higher than the control pressure at high flows because of the recovery of velocity head well downstream of the orifice plate 37. Greater compensation for rate of flow may be obtained by such an arrangement and may be advantageous in some circumstances.

The governor of FIG. 3 may also be used as a very sensitive pressure reducing valve as described in connection with the governor of FIG. 1, the impulse pipes 49 and 51 both being connected to the same region of the main or pipe, the restriction imposed by needle valve 52 producing a differential pressure when pressure in the said region of the main or pipe changes. The characteristic of fluid flow from which the differential pressure is derived is thus the rate of change of pressure at the said region of the main or pipe.

I claim:

1. Fluid flow control apparatus, for controlling the flow of fluid through a pipe, comprising a fluid flow governor; in the pipe, a fluid flow control valve the extent of the opening of which is solely determined by the governor and producing, in operation, a control pressure at a predetermined location in the pipe downstream of the valve; and means for producing, in operation, a differential pressure derived from a characteristic of fluid flow in the pipe, the fluid flow governor having a first pressure-responsive element to which the differential pressure is applied, spring means always connected to the first pressure-responsive element so as to act thereon in opposition to the differential pressure, a second pressure-responsive element to which the control pressure is applied, means for loading the second pressure-responsive element in opposition to the control pressure and means for combining displacements of the two pressure-responsive elements to control the setting of the fluid flow control valve.

2. Fluid flow control apparatus according to claim 1 wherein the characteristic of fluid flow is the rate of fluid flow through the pipe and the means for producing the differential pressure comprises a device producing, in operation, a pressure which is lower than a pressure upstream of the device, hereinafter called the higher pressure, the difference between the higher pressure and the lower pressure being the differential pressure.

3. Fluid flow control apparatus according to claim 2 wherein the device is an orifice plate in the pipe, the higher pressure being that upstream of the orifice plate and the lower pressure that in the region of the throat of the orifice plate.

4. Fluid flow control apparatus according to claim 2 wherein the higher pressure and the lower pressure are applied to opposed areas of the first pressure-responsive element, the resultant fluid pressure acting on the first pressure-responsive element being the differential pressure.

5. Fluid flow control apparatus according to claim 1 wherein the characteristic of fluid flow is the rate of change of fluid pressure at a specified region in the pipe and the means for producing the differential pressure comprises two impulse connections, one to each of opposed areas of the first pressure-responsive element, from the specified region of the pipe, one of the impulse connections including restricting means for producing at the first pressure-responsive element on change of pressure at the region, in operation, a pressure which is lower than the pressure, hereinafter called the higher pressure, in the other impulse connection, the difference between the higher pressure and the lower pressure being the differential pressure.

6. Fluid flow control apparatus according to claim 1 which further comprises an impulse connection including a throttling device through which the fluid pressure is applied to the first pressure-responsive element.

7. Fluid flow control apparatus according to claim 6 wherein the throttling device is adjustable.

8. A fluid flow governor for use in fluid flow control apparatus for controlling the flow of fluid through a pipe which includes a fluid flow control valve which the governor is adapted to control and means in the pipe for producing, in operation, a differential pressure derived from a characteristic of fluid flow in the pipe, the governor comprising a first pressure-responsive element, spring means for biassing, and always connected to, the first pressure-responsive element so as to act thereon in opposition to the differential pressure, a second pressure-responsive element, means for loading the second pressure-responsive element, means for enabling the differential pressure to be applied to the first pressure-responsive element in opposition to the spring means, means for enabling a control pressure to be applied to the second pressure-responsive element in opposition to the loading thereon and means for combining displacements of the two pressure-responsive elements so as to modify in accordance with the displacement of the first pressure-responsive element the effective setting of the fluid flow control valve for any given displacement of the second pressure-responsive element.

9. A fluid flow governor according to claim 8 wherein the displacement of the two pressure-responsive elements are combined at actuating means coupled to the fluid flow control valve or to servo means for actuating the fluid flow control valve.

10. A fluid flow governor according to claim 8 wherein at least one of the pressure-responsive elements is a flexible diaphragm.

11. A fluid flow governor according to claim 8 wherein the pressure-responsive elements are of equal effective area.

12. A fluid flow governor according to claim 8 wherein the spring means is a coil spring normally loaded in tension but capable of transmitting a compressive load, in the manner of a strut.

13. A fluid flow governor according to claim 12 wherein the coil spring has open coils stiff enough and with its end coils stably supported so as to be capable of transmitting such a compressive load.

14. A fluid flow governor according to claim 8 wherein the second pressure-responsive element is loaded by a compression spring.

15. A governor according to claim 14 wherein the stiffness of the compression spring is within the range of two to eight times the stiffness of the spring means.

16. A fluid flow governor for use in fluid flow control apparatus for controlling the flow of fluid through a pipe which apparatus includes a fluid flow control valve, and means in the pipe for producing, in operation, a differential pressure derived from a characteristic of fluid flow in the pipe, the governor comprising actuating means adapted to be coupled to the fluid flow control valve or to servo means for actuating the fluid flow control valve, a first pressure-responsive element, operatively coupled to the actuating means, spring means for biassing the first pressure-responsive element, a second pressure-responsive element operatively coupled to the first pressure-responsive element through the spring means, the first and second pressure-responsive elements being open to a first chamber in the sense that, in operation, forces on the pressure-responsive elements due to pressure in the first chamber oppose the spring means, the first pressure-responsive element being open to a second chamber in the sense that, in operation, the first pressure-responsive element is subjected to the differential pressure resulting from the difference in pressures in the first and second chambers, and the second pressure-responsive element being loaded in the sense to oppose, in operation, pressure applied to the second pressure-responsive element in the first chamber.

17. A fluid flow governor according to claim 16 wherein the spring means is a coil spring normally loaded in tension but capable of transmitting a compressive load, in the manner of a strut.

18. A fluid flow governor according to claim 17 wherein the coil spring has open coils stiff enough and with its end coils stably supported so as to be capable of transmitting such a compressive load.

19. A fluid flow governor for use in fluid flow control apparatus for controlling the flow of fluid through a pipe which includes a fluid flow control valve which the governor is adapted to control and means in the pipe for producing, in operation, a differential pressure derived from a characteristic of fluid flow in the pipe, the governor comprising a first pressure-responsive element, spring means for biassing the first pressure-responsive element, a second pressure-responsive element, means for loading the second pressure-responsive element, means for enabling the differential pressure to be applied to the first pressure-responsive element in opposition to the spring means, means for enabling a control pressure to be applied to the second pressure-responsive element in opposition to the loading thereon and means adapted to control the setting of the fluid flow control valve for combining displacements of the two pressure-responsive elements at fluid flow valve means having first and second relatively movable elements which co-operate to define a closed or neutral position, the first pressure-responsive element being operatively connected to the first relatively movable element and the second pressure-responsive element being operatively connected to the second relatively movable element.

20. A fluid flow governor according to claim 19 wherein the relatively movable elements are a valve body and a valve member movable therein.

* * * * *